INVENTOR.
Oscar W. Anderson
BY Jack M. Anderson
Martin G. Anderson
ATTORNEY

March 18, 1952     O. W. ANDERSON ET AL     2,589,593
DRILL CASE

Filed Aug. 30, 1948     3 Sheets-Sheet 2

INVENTOR.
Oscar W. Anderson
BY Jack M. Anderson

ATTORNEY

March 18, 1952  O. W. ANDERSON ET AL  2,589,593
DRILL CASE
Filed Aug. 30, 1948  3 Sheets-Sheet 3
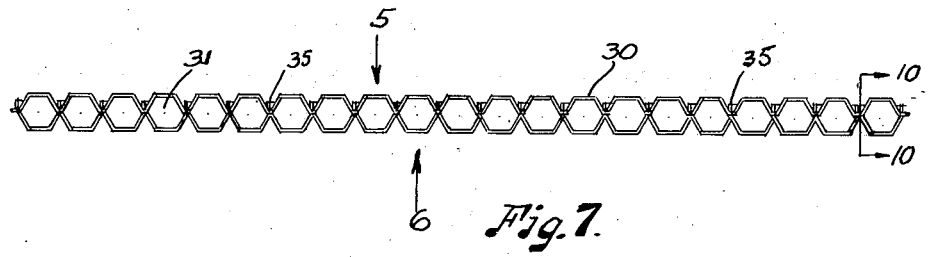
Fig. 7.
Fig. 14.
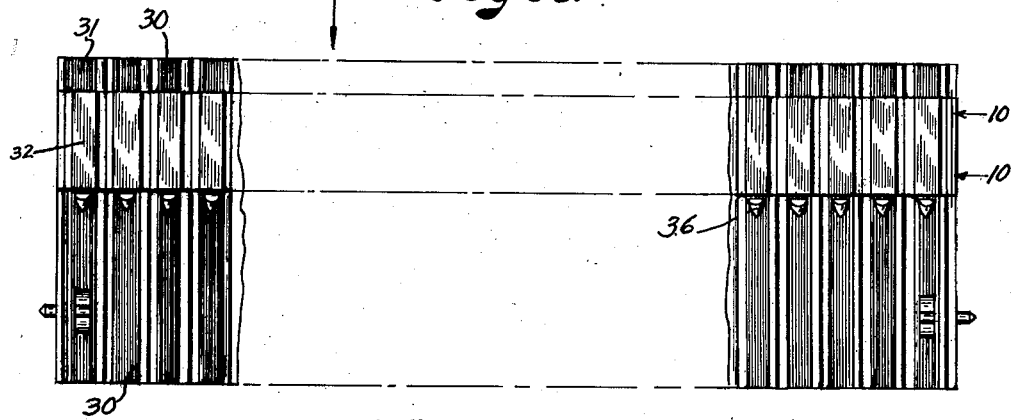
Fig. 6.
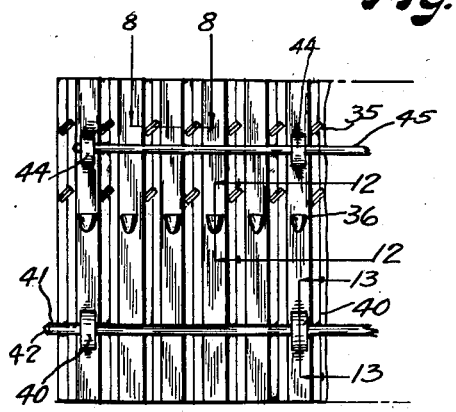
Fig. 5.
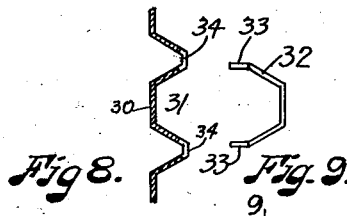
Fig. 8.   Fig. 9.
Fig. 10.  Fig. 11.  Fig. 12.
Fig. 13.
INVENTOR.
Oscar W. Anderson
BY Jack M. Anderson
Martin E. Anderson,
ATTORNEY Patented Mar. 18, 1952

2,589,593

UNITED STATES PATENT OFFICE 2,589,593

DRILL CASE

Oscar W. Anderson and Jack M. Anderson, Denver, Colo.

Application August 30, 1948, Serial No. 46,878

6 Claims. (Cl. 206—46)

This invention relates to tool cases and more particularly to a case for twist drills.

In the servicing or adjusting of gas burners, it is common practice for gas service men to be equipped with a set of drills of the smaller "wire" sizes for enlarging the orifices which meter gas flow. These drills are of various sizes, the smaller being number 80, or smaller, and range to number 40, or larger. These drills, especially in the smaller sizes, are fragile, easily bent, so small that if mislaid are often lost, and are often mixed with other similar drills necessitating the use of a micrometer or drill gage to determine their size. Carburetor and oil burner mechanics, machinists, model makers, jewelers, and others, employ small drills of this class and encounter similar problems of gas burner service men hence the particularly use is given only by way of illustration.

One of the principal objects of the invention is to provide a drill case which will hold a plurality of twist drills in such manner that they are protected against damage.

Another object is to provide a case in which the drills automatically assume a position of access thereto when the case is opened.

Another object is to provide a case in which the drills are supported against unauthorized movement therewithin by handles attached to the drills.

Another object is to provide a drill case with identical compartments and in which drills of various sizes with handles thereon may be interchangeably held in any compartment.

A further object is to provide a case having parts which may be easily manufactured and quickly assembled.

A still further object is to provide a case which will prevent, to a large extent, any mixing of the drills.

Still further objects, advantages, and salient features will become more apparent from a consideration of the description to follow, the appended claims, and the accompanying drawing in which:

Figure 5 is a plan view of a portion of the back side of a drill holder, taken in the direction of arrow 5, Figure 7;

Figure 6 is a plan view of the front side of a holder taken in the direction of arrow 6, Figure 7;

Figure 7 is an end elevation of the holder taken in the direction of arrow 7, Figure 6;

Figure 8 is an enlarged section taken on line 8—8, Figures 5 and 10;

Figure 9 is an end elevation of a part of the holder taken in the direction of arrow 9, Figure 11;

Figure 10 is an enlarged section taken on line 10—10, Figures 6 and 7;

Figure 11 is a side elevation of the part shown in Figure 9;

Figure 12 is an enlarged section taken on line 12—12, Figure 5;

Figure 13 is an enlarged section taken on line 13—13, Figure 5; and

Figure 14 is an end elevation of a modified type of holder.

Figure 1:
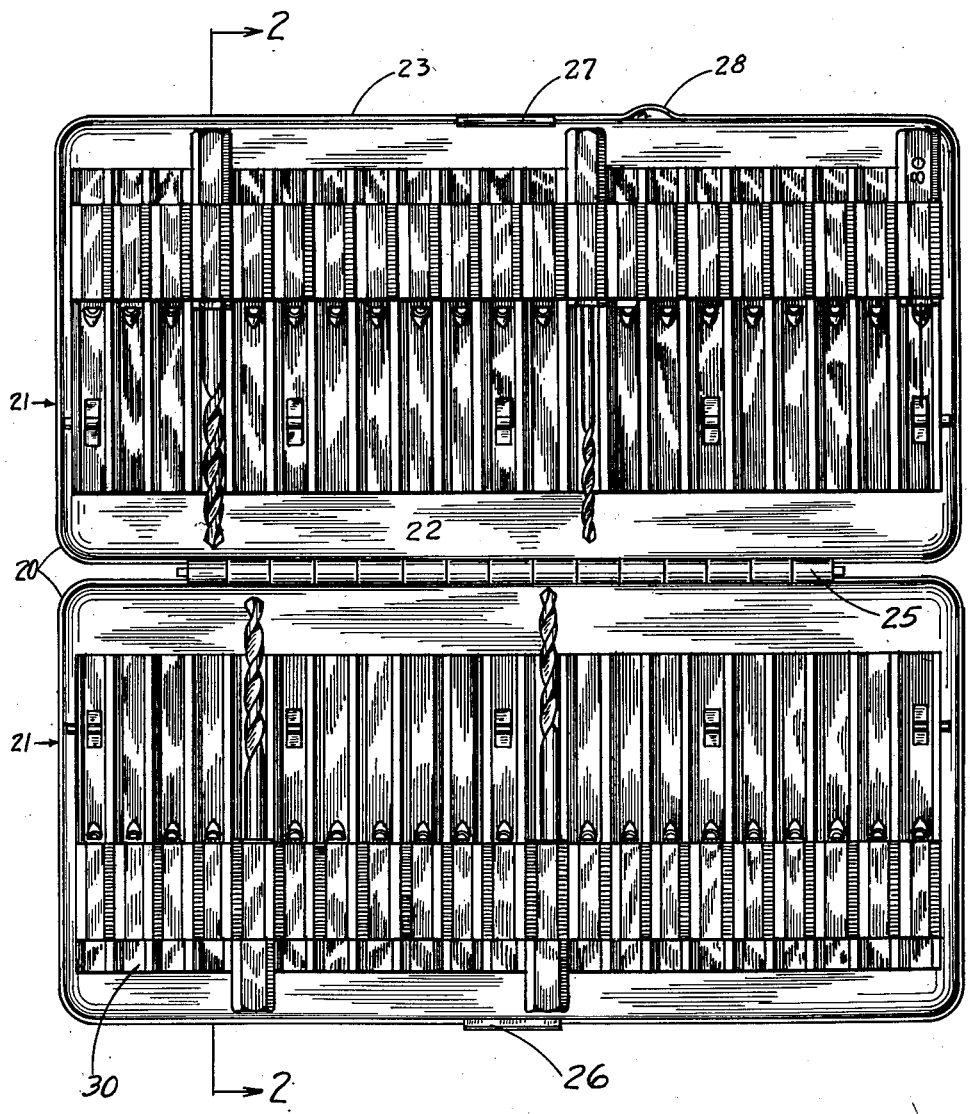
Figure 1 is a plan view of the drill case in open position.
Figure 4:
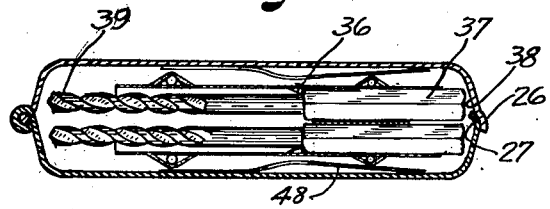
Figure 4 is a section similar to Figure 2, but with the case closed.

Referring in detail to the drawing, there is shown in Figure 1 a drill case 20 formed of containers 21, 21, each having a flat base 22 and an upstanding marginal wall 23 terminating in an edge 24, each base and marginal wall forming a shallow open top box. The two containers are connected together along one longitudinal edge by a piano hinge 25, integrally formed from the marginal walls of the case. One container has an integral clasp 26 projecting beyond edge 24 which frictionally engages a similar projecting member 27 on the other container when the case is closed, as shown in Figure 4, thus securely holding the contents of the case therewithin. A projection 28 is formed on a marginal edge of the container opposed to the one which carries the clasp to facilitate opening the case. Opening may best be effected by grasping the case in the hands with the fingers thereof about the hinge and spreading the two containers apart by pressure of the two thumbs on clasp 27 and projection 28. With the exception of the clasp and projection structure just described, the two containers 21, 21, of case 20 are identical in all respects, hence, the remainder of the structure will be described for one container only, it being understood that the subsequent description applies to either or both containers.

Figure 2:
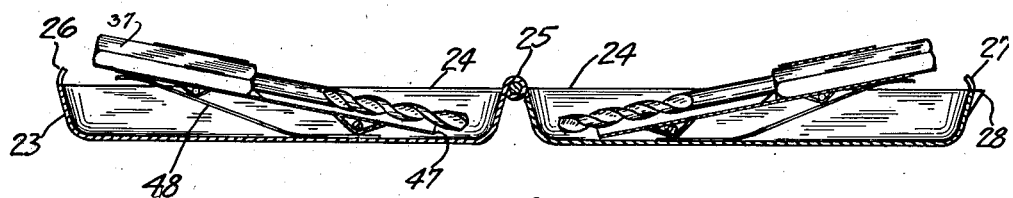
Figure 2 is a section taken on line 2—2, Figure 1.

A drill holder 30 is pivotally mounted in container 21 and is adapted for movement from a position in which the holder lies below edge 24, as shown in Figure 4, or to a position in which a portion thereof lies above such edge, as shown in Figure 2, to provide access to the drills held thereby.

Holder 30 is formed of sheet material corrugated to form a plurality of parallel channels 31, these being identical in cross section and as shown (except Figure 14) are a half section of a hexagon.

A plurality of semi-hexagonal members 32 are joined to the edges of these channels by projections extending from the edges thereof and which enter apertures 34. Projections 33 are then twisted to provide securement to holder 30, as best shown at 35, Figure 5, channels 31 and members 33 thus forming hexagonal pockets open at each end, these pockets extending only across a portion of the width of holder 30. Adjacent one end of each member 32 an abutment 36 is struck from holder 30, this abutment extending part way into channel 31. Referring to Figure 4 it will be observed that abutment 36 engages one end of a handle 37 to which a drill is attached to thus limit movement of the drill into the pocket. The marginal wall also provides an abutment 38 to limit movement of the handle outwardly of the pocket. It is thus apparent a drill 39 is supported in the holder entirely by its handle and spaced from holder 30. Since the drill 39 does not engage any part of the holder, the point and flutes thereof will not become dulled or damaged from shaking, impact, or other vibration of the case.

Figure 3:
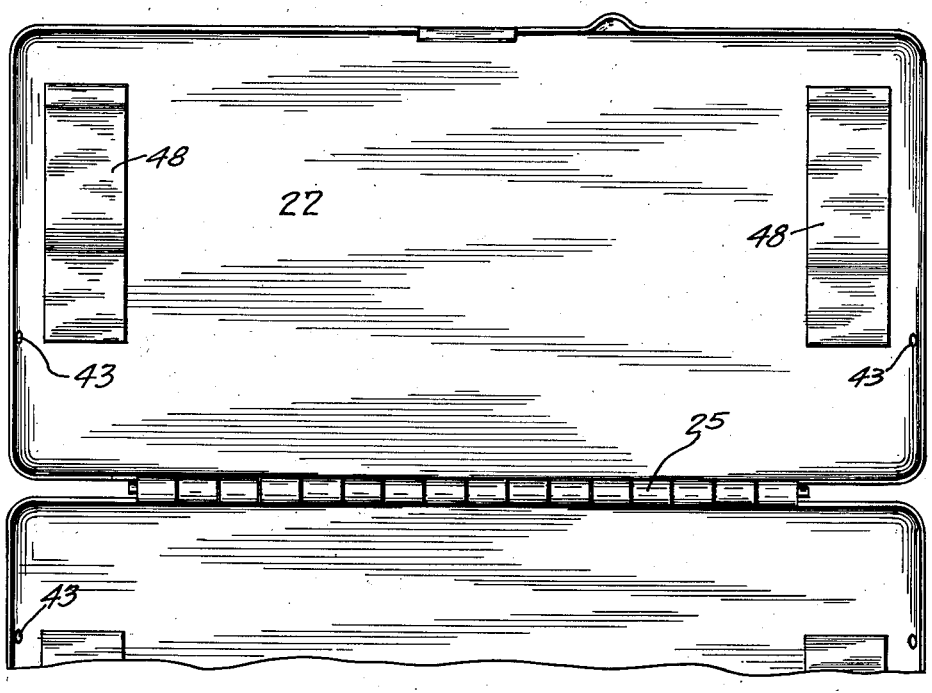
Figure 3 is a plan view of a portion of the case with the drill holders removed.

Spaced inwardly from the edge of the holder opposite to that wherein the pockets are formed, certain bottoms of the channel walls of holder 30 are struck outwardly to form a plurality of spaced loops 40 as best shown in Figures 5 and 13. A hinge pin 41 is disposed within these loops and has conical ends 42 which extend beyond the ends of holder 30. These ends enter conical depressions 43, Figure 3, formed in the marginal walls. Similar loops 44 and a pin 45 may be provided under the pockets, where additional reinforcement of holder 30 is desired. The entire holder structure is constructed so that it may be flexed laterally of the hinge pin axis, this flexure shortening the length of pin 41 between opposite depressions 43, thus permitting easy insertion or removal of the holder within container 21.

As shown in Figure 2, the axis of pin 41 is so chosen that the holder tilts to a position, when the case is open, to permit access to the ends of the drill handles. One edge 47 provides an abutment to limit this movement and a pair of springs 48 engage the backs of the holders to urge them to the position shown in Figure 2. It thus becomes apparent that upon opening the case from the closed position shown in Figure 4 to a slightly open position, springs 48 automatically urge the drill holders to a predetermined position in which the drill handles are readily accessible for removal or replacement with the tips of the fingers of the hand.

In Figure 14 is shown another form of drill holder 50. Holder 50 is essentially the same as holder 30, previously described, but the channels are semi-circular rather than semi-hexagonal. The loop structure for the hinge pin and the abutments for the drill handles may also be incorporated in this form of holder. The cap portions which form the pockets may be made as a single piece, as shown, and the two semi-circular parts secured together adjacent the edges of the channels at 51 in any way desired such as by solder, welding, rivets, or the like. It is also apparent that the cap portions may be made as individual pieces as shown in Figures 9 and 11 and securement effected in the same manner shown in such figures. When the holder is constructed as just described, the handles on the drills could be made circular in cross section and knurled, if desired, to provide a roughened surface which would functionally serve the same purpose as the corners of the hexagonal handles. Also, hexagonal handles could be employed in the circular pockets by merely constructing the pockets of such size that they would circumscribe, with slight clearance, the corners of the hexagon. It also becomes apparent that other shapes of handles may be employed, such as square, octagon, or any other number of sides and the pockets of the drill holder constructed in accordance with the desired shape of handle.

Sheet metal has been found to be an expedient material to employ in constructing the case since it may be readily blanked, punched, formed, etc., and hence the invention has been described accordingly. It now becomes apparent, however, that the invention may be practiced with other materials, for example, the case or drill holder, or both, may be constructed as die or other castings, or may be moulded from plastic, and various combinations of such materials may be used.

It is to be particularly noted that the drill case of this invention differs in marked respects from prior art devices. In the prior art, drill containers, cases, or the like, are usually constructed so that the means which holds or otherwise retains the various drills of different sizes in place conforms in some manner to the general size of the drill. For example, holes of various sizes may be provided into which the drill shanks may be inserted, or an enclosure or pocket provided which generally conforms to the diameter and length of the drill. In these prior art devices there is only one particular place for a particular size drill and hence interchangeability is not possible. In the present invention all the drill pockets are identical and by reason of provision of handles of the same size for the various size drills any drill may fit any pocket. This identity of pocket structure not only simplifies the construction, but also adds versatility to the case. In some instances the mechanic may desire a particular order of the series of drills so that they may be removed, used, and replaced in sequence. With the present construction, this is possible since the drills are interchangeable in the pockets. It is also apparent that other small tools may be placed in the holder, such as reamers, counterbores, centerpunches, and others, these being constructed with a handle structure the same as employed with the drills.

The case also minimizes loss of small drills. In Figure 1 a very small drill, marked "80" on the handle, is shown. A drill of this size is only thirteen thousandths of an inch in diameter and about one inch long, and hence not easily distinguishable with the naked eye. By mounting such drill in a handle many times larger than the drill, however, the handle being readily distinguishable, and the drill being fixed thereto, there is less likelihood of loosing the drill if mislaid. The primary purpose of the handles is, of course, to provide a gripping surface which may be manipulated by the fingers of the hand. The drill size is also stamped on each handle so that the diameter of the drill may be visually determined, thus obviating the use of a micrometer or drill gage. The noncircular pockets also prevent rotation of the handles therein. Thus, if the drills are replaced in the pockets with the numbers thereon in a visible position, they will remain in such position regardless of the amount of shaking or vibration to which the case may be subjected. This, of course, facilitates selection of the proper drill.

While the drill holders 30 have been described in connection with a particular type of casing, it is apparent that other casings could be used with the drill holders within the spirit of the invention. Each drill holder consists essentially of a suitable pocket structure which supports the handles of the drills to thus support the drills by the handles, and the casing is essentially a protecting device and also a means for preventing the drill handles from moving outwardly in the pockets. It is apparent, therefore, that means, other than a casing, could be employed to prevent the drill handles from moving outwardly of the pockets, hence the use of the drill holder is not to be limited to the specific casing disclosed except as limited by the appended claims.

Having described the invention what is claimed as new is:

1. A holder for use in a container for drills, said holder comprising, a metal sheet corrugated to form a plurality of parallel open channels, similar sheet metal means joined at the edges thereof to channel edges of the first metal sheet to form a plurality of pockets into which drill handles may be inserted, abutment means struck from the first sheet and extending into the channels thereof for engaging the handles of drills, loops struck from the bottoms of certain of the channels of the first sheet, and a hinge pin disposed within said loops having ends projecting beyond the holder for pivotal engagement with end walls of the container.

2. A holder in accordance with claim 1 wherein said similar sheet metal means comprises a plurality of separate sheet metal members having ears projecting beyond their channel edges, said ears extending through slots in the first sheet metal member and being twisted to provide securement thereto.

3. A drill case comprising, a pair of similar members, each having a generally rectangular rigid base and upstanding rigid walls thereabout, each forming a shallow box with a peripheral edge substantially parallel with its base, pivot means securing the boxes together along their edges for movement between an open position of the case and a closed position thereof in which the edges are in substantially abutting relation, a drill holder in each box, means pivotally mounting a holder to opposite walls of a box in such manner that a holder may lie below an edge thereof or lie with a portion thereof above an edge, each holder comprising a plurality of parallel spaced substantially identical rigid tubular pockets, a plurality of drills of different diameter having substantially identical handles at one end of each, the handles being of uniform cross-section throughout their lengths and larger in cross-section than the largest of the drills, the handles being disposed within the pockets, and stop means on the holders for limiting axial movement of the handles into the pockets.

4. A container for drills comprising a base having upstanding marginal walls thereabout forming a shallow box, a drill holder having a plurality of parallel spaced substantially identical tubular pockets disposed within the box adapted to receive a plurality of substantially identical handles of a set of drills to which the handles are attached, a hinge pin carried by the holder having opposite ends thereof engageable in depressions in opposite walls of the box, said hinge pin and holder being laterally flexible and adapted to permit engagement and disengagement of said ends upon lateral flexure thereof to permit attachment and detachment of the holder and hinge pin to and from said walls.

5. A container for drills comprising, a base having upstanding marginal walls thereabout forming a shallow box, a drill holder having a plurality of parallel spaced substantially identical tubular pockets disposed within the box adapted to receive a plurality of substantially identical handles of a set of drills to which the handles are attached, said holder having a plurality of loops struck laterally therefrom, and a pivot pin passing through said loops having its ends pivotally connected to opposite walls of the box.

6. A drill container in accordance with claim 5 including a second plurality of loops struck from the holder and a second pin passing through the last named loops adapted to reinforce the holder against lateral flexure.

OSCAR W. ANDERSON.
JACK M. ANDERSON.

REFERENCES CITED

The following references are of record in the file of this patent:

UNITED STATES PATENTS

| Number | Name | Date |
| --- | --- | --- |
| 979,981 | Milke | Dec. 27, 1910 |
| 1,101,310 | Mendelson et al. | June 23, 1914 |
| 1,622,818 | Wismer et al. | Mar. 29, 1927 |
| 1,859,401 | Lengsfield | May 24, 1932 |
| 1,930,617 | Huot | Oct. 17, 1933 |

FOREIGN PATENTS

| Number | Country | Date |
| --- | --- | --- |
| 138,635 | Austria | Aug. 25, 1934 |